March 26, 1963 F. ALVAREZ DE TOLEDO 3,082,615
APPARATUS FOR FORMING MINERAL FIBERS
Filed Nov. 25, 1960 5 Sheets-Sheet 1

INVENTOR.
FERNANDO ALVAREZ DE TOLEDO
BY
Attorneys

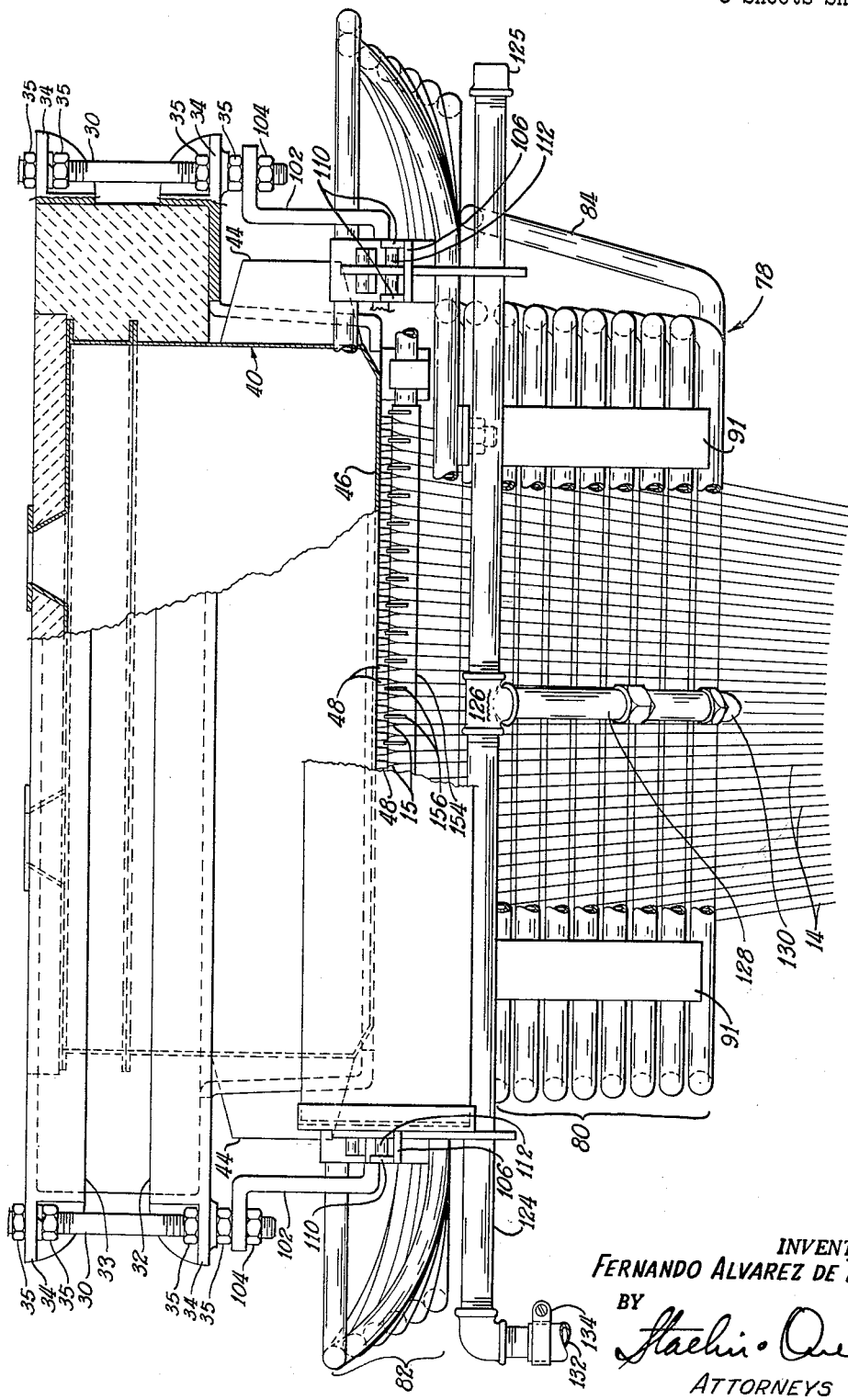

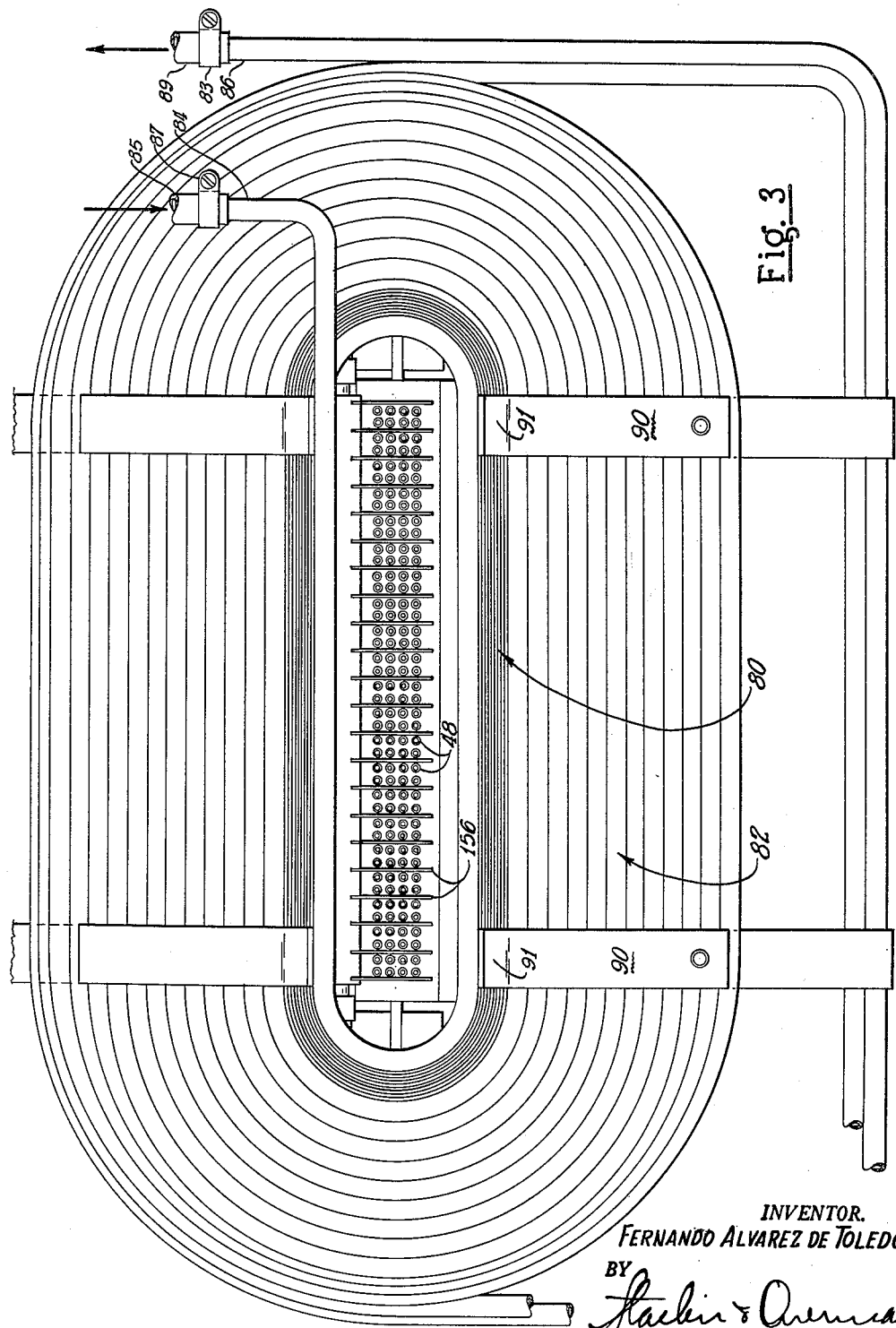

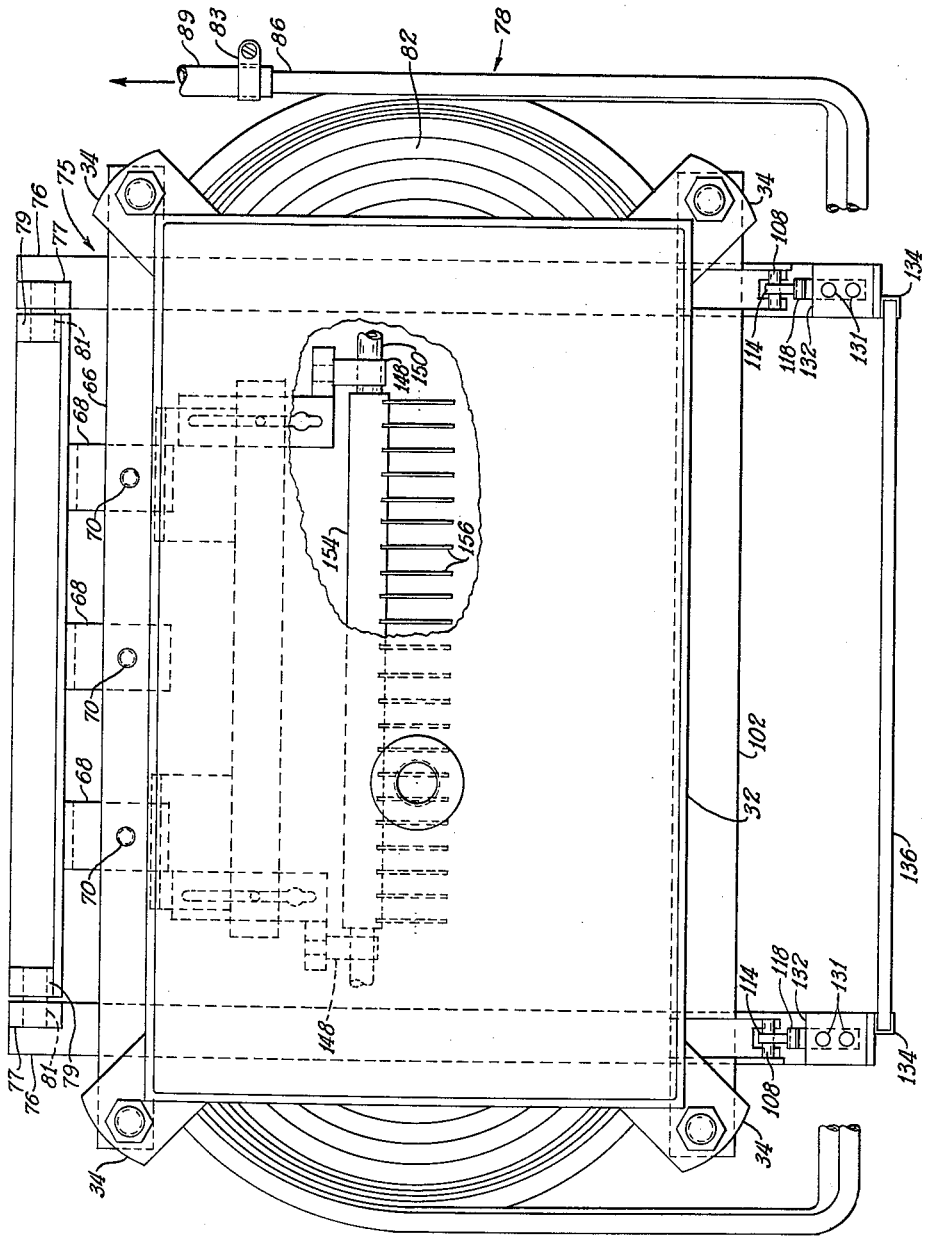

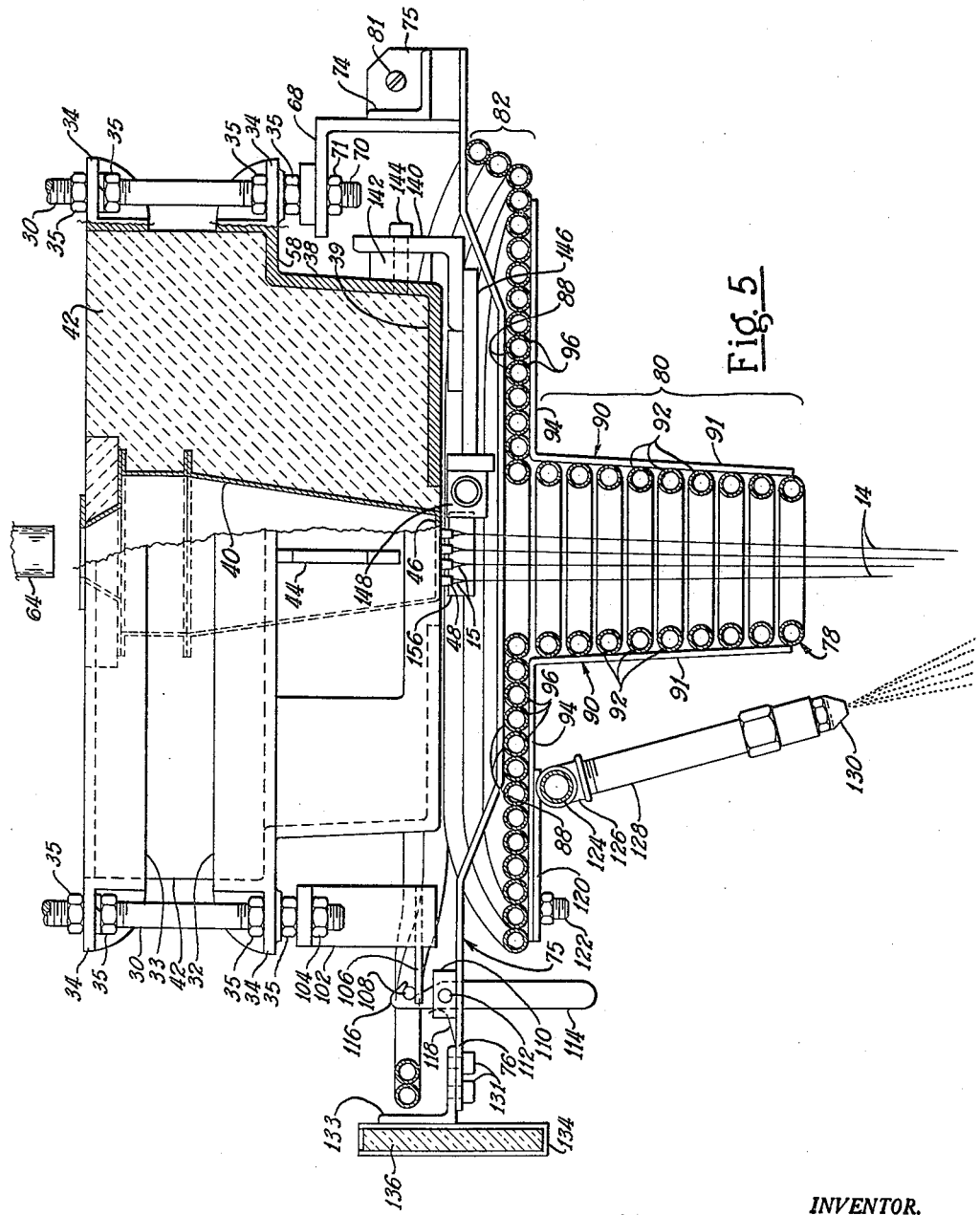

# United States Patent Office 3,082,615
Patented Mar. 26, 1963

3,082,615
APPARATUS FOR FORMING MINERAL FIBERS
Fernando Alvarez de Toledo, New York, N.Y., assignor to Owens-Corning Fiberglas Corporation, a corporation of Delaware
Filed Nov. 25, 1960, Ser. No. 71,536
9 Claims. (Cl. 65—12)

This invention relates generally to apparatus for forming fibers of glass or other mineral materials and more especially to control and stabilization of ambient temperature of the highly heated environment of a stream feeder of the character employed for flowing streams of glass or other molten mineral materials and for reducing the temperature at the region beneath a stream feeder.

In the manufacture of fine filaments of glass, it has been a practice to employ electrically heated feeders or bushings supplied with glass usually in the form of marbles or spheres, the floor or bottom of the feeder or bushing provided with a large number of small openings through which streams of glass are delivered from the feeder. The streams are attenuated to fine filaments by converging the filaments of the group into a strand and winding the strand upon a collector rotating at a comparatively high speed in order to attenuate or draw the streams into fine filaments.

In order to promote the uniformity of the streams discharged through the openings, it is desirable that the glass or other mineral material in the feeder be elevated to a temperature sufficient to condition the glass at a low viscosity, i.e., in a liquidus or readily flowable state to secure more uniform streams and uniform flow of glass from the feeder. In order to satisfactorily attenuate the streams to filaments, it is desirable to reduce the temperature of the streams at a region adjacent the feeder to an extent as to increase the viscosity of the glass of the streams so that the streams may be conditioned for attenuation. In certain installations, metal heat absorbing fins are disposed adjacent the streams in juxtaposition to the streams in order to convey away heat from the streams and thus increase their viscosity as disclosed in Patent 2,908,036 issued to Robert G. Russell. In such arrangements, the amount of heat withdrawn from the streams is small compared with the amount of heat radiated into the region of the feeder and, in installations where a number of feeders are disposed in adjacent relation, a substantial amount of heat is present creating an uncomfortable environment for the operators. Furthermore, it is a practice to spray fine mists of water onto the newly formed filaments to minimize interabrasion of the filaments, a factor fostering high humidity conditions accentuating the discomfort of the operators.

The substantially unconfined heat emanating from the stream feeder and the streams and the movement of air induced by the high velocities of the filaments, being upwards of 15,000 or more feet per minute, tend to promote an unstable temperature environment at the region of attenuation of the streams.

The present invention embraces a means of impeding heat flow and absorbing heat at a region spaced from a feeder arranged to discharge streams of filament-forming mineral material whereby to attain a more stable environment of temperature and atmospheric quiescence at the region of attenuation of filaments from the streams.

The present invention provides a means for establishing and circulating a temperature reducing medium adjacent a stream feeder for absorbing and conveying heat away from the environment of the feeder to reduce the ambient temperature at the filament attenuating region and the winding station.

Another object of the invention embraces a means for conveying away radiated heat from a stream feeder thereby reducing and stabilizing the temperature ambient the streams at their region of delivery from the feeder to increase the viscosity of the streams and thereby improve attenuation of the streams to fine filaments.

Another object of the invention resides in an apparatus for circulating a heat absorbing fluid adjacent a stream feeder for high temperature mineral materials to reduce the temperature of the room or compartment in which one or more feeders are installed.

Another object of the invention resides in an apparatus for circulating a cooling medium in the environment of a stream feeder and in a region ambient the streams to effectively absorb heat from the streams to condition the streams and promote more efficeint attenuation of the streams to continuous filaments.

Another object of the invention is the provision of a series of coils disposed adjacent and spaced from a stream feeder and a series of coils surrounding the group of streams flowing from a feeder through which a heat absorbing fluid is circulated to reduce the heat output radiated into the room and simultaneously reduce the temperature of the streams to increase the viscosity thereof.

Furthere objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 2 is an elevational view of the stream feeder illustrating the arrangement of cooling coils adjacent the feeder and surrounding the streams delivered from the feeder;

FIGURE 3 is a top plan view of the feeder and cooling coil assembly;

FIGURE 4 is a top plan view of the feeder and its supporting structure, the cooling units being removed therefrom, and FIGURE 5 is an elevational view of a feeder, the coils of the cooling unit being illustrated in section.

Figure 1:
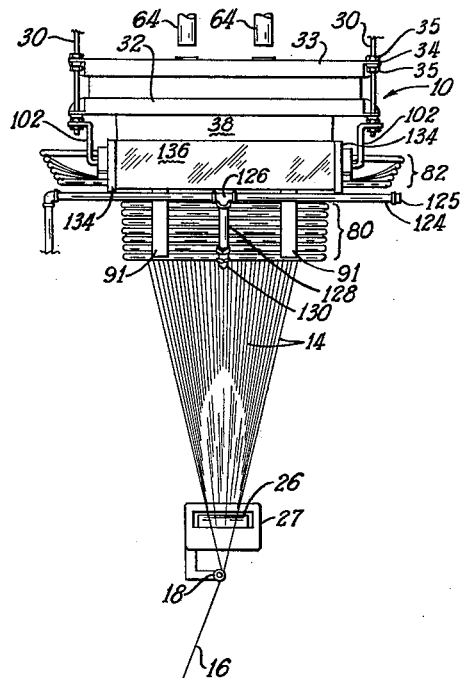
FIGURE 1 is an elevational view of a stream feeder for molten mineral material and filament attenuating means associated with a form of apparatus of the invention.

While the method and apparatus of the invention have particular utility with stream feeders employed for flowing streams of molten glass for attenuation into continuous filaments, it is to be understood that the method and apparatus may be employed with apparatus for feeding streams of other materials such as slag or molten rock.

Referring to the drawings in detail, and initially to FIGURE 1, there is illustrated a stream feeder apparatus 10 from which streams of molten glass are flowed and attenuated into continuous filaments 14, the filaments being converged into a strand 16 by means of a gathering pad 18 and the strand wound upon a rotating collector or tube 20. The collector 20 is mounted upon an arbor 22 journally supported upon a housing 24 and is driven at comparatively high speed by a motor (not shown) to wind the strand of filaments upon the collector 20 and attenuate the streams to fine filaments by reason of the winding of the strand of filaments upon the rotating collector or tube 20. The strand is distributed lengthwise of the collector by a traversing means 21 of conventional construction.

The filaments may be attenuated at linear speeds that may reach 15,000 to 20,000 feet per minute or more. The fan-shaped pattern of filaments may be engaged with a roller 26 journaled in a receptacle 27 containing a lubricant or binder whereby the lubricant or binder coats the filaments through engagement thereof with the roller 26, the latter constantly receiving a film of lubricant or coating from the supply in the receptacle 27.

The stream feeder unit is suspended by bolts 30 which are connected with a supporting structure (not shown). Supported by the bolts 30 is a substantially rectangular main frame structure comprising substantially rectangular frame sections 32 and 33 formed of metal, each formed with outwardly extending flanges or ears 34 at the corners thereof having openings to accommodate the bolts 30, the main frame sections being secured in position by pairs of nuts 35.

The frame section 32 is provided with a depending portion 38 in which is disposed a substantially rectangular feeder 40 formed of an alloy of platinum and rhodium or other suitable high temperature resistant material. The feeder 40 is surrounded by high temperature resistant refractory 42 contained within the depending portion 38 of frame 32 and extending upwardly into the frame section 33 as shown in FIGURE 5. The platinum alloy feeder or bushing 40 is preferably electrically heated, the ends of the bushings being provided with terminals 44 shown in FIGURE 2 which are adapted to be connected with current conductors supplied with current of low voltage and high amperage.

The bottom wall or floor 46 of the feeder 40 is provided with a comparatively large number of depending nipples or tips 48 arranged in rows, each tip being provided with an opening or orifice through which a stream 15 of molten glass or other material is flowed, discharged, or delivered from the feeder 40. As shown in FIGURES 2 and 5, the region of the streams 15 adjacent the tips 48 are of cone-shape and glass of the streams is drawn into the filaments 14 by the winding of the strand 16 of filaments on the collector 20. The frame section 32 is formed with a flange portion 58 engaging the refractory 42.

The glass is introduced into the feeder 40 preferably in the form of marbles or spheres about three-quarters of an inch in diameter delivered through one or more chutes 64 from a marble supply (not shown). The glass is pre-refined and molded in marbles providing a high quality glass especially usable for forming textile filaments. The introduction of the marbles into the feeder 40 through the chute 64 is attained by a marble delivery means controlled by suitable means such as a probe device (not shown) responsive to variations in the level of molten glass in the feeder 40 for maintaining a substantially constant level of molten glass in the feeder 40.

The arrangement is inclusive of a method of and means for circulating a heat absorbing or cooling fluid in a region embracing the streams 15 of glass and surrounding the upper regions of the filaments 14 to provide a temperature control and stabilization of the environment of the streams and to absorb and convey away heat from the feeder and thereby provide for a reduced temperature at the operator's station.

Supported from the rear flange 34 of the frame section 32 are L-shaped members 68 secured to the flange 34 by bolts 70 and nuts 71. Welded or otherwise secured to the brackets 68 is an elongated member 74 provided with blocks 79 as shown in FIGURE 4.

A supplemental frame or frame structure 75 is articulately or pivotally mounted upon or supported by the member 74, the frame 75 carrying the cooling coil arrangement of the invention. The frame 75 is inclusive of parallel bars or members 76 arranged adjacent to the ends of the depending portion 38 of the frame section 32 as shown in FIGURE 4. The rear ends of the bars 76 are provided with blocks 77. The blocks 77 and 79 are provided with aligned openings to receive pivot pins 81 which form pivotal supports for the supplemental frame structure.

The arrangement of coils, loops or convolutions of tubing or conduit 78 for accommodating a circulating heat-absorbing fluid are supported by the bars 76. The tubing or conduit 78 is preferably continuous and provides, in effect, two heat-absorbing sections, viz. a section 80 embracing the streams and surrounding the filaments formed therefrom for a comparatively short distance from the feeder, and a second section 82 of convolutions, a major number of which are arranged in a horizontal or planar pattern as particularly shown in FIGURE 5.

The horizontal convolutions of the cooling section 82 are in parallelism with and spaced beneath the floor 46 of the feeder and the horizontal floor portion 39 of the frame section 32. The conduit 78 is provided with an inlet portion 84 and becomes the lowermost convolution, loop or coil of the section 80 of the cooling unit as shown in FIGURE 2. It will be noted that the nipples or orificed tips 48 are arranged in several rows lengthwise of the feeder 40 as shown in FIGURE 2 and as illustrated in FIGURE 3 the convolutions, coils or loops are of oblong configuration or shape to embrace the elongated rows of orificed tips 48.

The outlet of the continuous tube or duct is shown at 86 in FIGURE 3. The inlet region 84 of the duct sections is connected with a source of fluid, such as water, under pressure by means of a flexible tube 85 secured to the duct by means of a clamp 87 as shown in FIGURE 3. The outlet portion 86 of the duct construction is similarly connected with a flexible tube 89 secured to the duct by a clamp 83. Through the provision of the flexible tubes 85 and 89 the conduit sections of the cooling unit are movable with the supplemental frame 75 to an out-of-use position.

From FIGURES 2, 3 and 5 it will be apparent that the coils 80 of the cooling unit are in stacked relation vertically with respect to the feeder and the coils of section 82 of the cooling unit are generally in a planar formation at the region beneath and spaced from the feeder 40 and the floor 39 of the frame section 32.

The outer convolutions of section 82 are arranged in the manner or pattern illustrated in FIGURE 2, being stacked in an upward and outward direction from the section 80 of the cooling unit. The convolutions of the section 82 in contact with the lower surfaces of the bars 76 are brazed or otherwise joined to the bars at the points of contact indicated at 88.

Arranged at the lateral regions of the section 80 of the cooling unit are L-shaped brackets or strips 90, the depending portions 91 of the strips being brazed or otherwise secured to the convolutions or turns of the tubing 80 at the regions of contact indicated at 92. The horizontal leg portions 94 of the L-shaped members 90 are brazed to the loops, turns or convolutions of the tubing of the section 82 at their regions of contact 96.

Thus the convolutions or turns of the section 80 are secured to the strips 90 and the convolutions of the section 82 in a horizontal plane are thus secured to the horizontal leg portions 94 of the strips or brackets 90. The heat absorbing fluid or water enters the inlet portion 84, traverses the loops or turns of the section 80, thence traverses the loops or turns of the section 82 and is discharged through the outlet 86. The water or fluid discharged from the outlet may be passed through a condenser and re-used if desired.

The section 80 of stacked convolutions embracing or surrounding the upper regions of the filaments 14 absorbs heat from the streams of glass and from the filaments thus reducing the temperature of the glass of the streams and correspondingly increasing its viscosity so that the filaments 14 may be satisfactorily attenuated from the streams at high rates of speed. The circulating fluid in the sections 80 and 82 of the cooling unit absorb radiant heat from the feeder and function as a barrier to impede downward flow of heat so that a reduced temperature is maintained beneath the feeder.

Furthermore the circulating cooling fluid stabilizes the temperature adjacent the streams and the filaments, and the baffle arrangement provided by the duct or tubing forming the coils reduces air turbulence in this area so as to promote improved stabilization and attenuation of the streams. The coils of the sections are spaced from the feeder and the portions 38 of the frame section 32 in the manner illustrated in FIGURES 2 and 5 a sufficient distance to minimize the transfer of heat by convection so that the major heat transferred to the cooling fluid is radiant heat.

Thus the cooling unit being beneath the feeder and its associated components impedes or blocks the output of heat in the region beneath the cooling unit in addition to stabilizing the temperature environment of the streams and filaments.

Means is provided for maintaining and securing the supplemental frame 75 and the cooling unit construction in its operative or effective position shown in FIGURES 1, 2 and 5. Extending lengthwise of the forward portion of the main frame section 32 is a bar or bracket 102 which is secured to the bolts 30 at the forward portion of the main frame by means of securing nuts 104. Welded or otherwise secured to the bracket 102 are strips or members 106. Welded to an upper surface of each of the strips 106 is a cylindrical member or pin 108 forming a keeper for a latch means.

Provided on each of the strips 106 is an upwardly extending ear or projection 110 which supports a stub shaft 112. Pivotally mounted upon each of the stub shafts 112 is a latch member 114 provided with a hook-like portion 116, the recess of which is adapted to engage a pin 108 carried by a strip 106 as particularly shown in FIGURE 5. Each of the latch members 114 is biased into engagement with a pin 108 under the influence of a spring 118.

It will be noted from FIGURE 5, that the supplemental frame 75 carrying the cooling unit sections 80 and 82 is supported in its position of use adjacent the feeder and the streams 15 by engagement of the latch members 114 with the pins 108. When it is desired to move the cooling unit away from its operative position, the latch members 114 are pivoted about their pivot shafts 112 to disengage the latch portions 116 from the keeper pins 108, and the supplemental frame 75 and components carried thereby pivotally moved about the pivot pins 81 shown in FIGURES 4 and 5.

The supplemental frame 75 provides a means for supporting an arrangement for delivering a spray of water onto the newly formed filaments at a region below the cooling unit section 80. Disposed adjacent the horizontal portions 94 of each of the brackets 90 is a strip or member 120 secured to the section 94 by means of bolts 122. Extending longitudinally of and in substantial parallelism with the feeder 40 is a manifold or pipe 124.

Connected with the pipe 124 at the central area of the fan of filaments is a T-shaped fitting 126 to which is connected a depending tube or pipe 128 equipped with a spray nozzle 130. The pipe 124 is connected with a source of water under pressure by means of a flexible tube 132, a clamp 134 securing the flexible tube to the pipe arrangement 124. The flexible tube 132 facilitates movement of the supplemental frame and components carried thereby to an out-of-use position as hereinbefore described.

As shown in FIGURE 2 an end region of pipe 124 is provided with a cap 125 but this may be removed and a continuation of pipe 124 connected therewith for conveying water under pressure to cooling units of adjacent stream feeders where several feeders are employed.

Secured to the forward extremities of the strips 76 of the supplemental frame 75 are L-shaped brackets 133 secured to the strips 76 by screws 131 as shown in FIGURES 2, 4 and 5.

Secured to each of the brackets 133 is a channel-shaped member 135 in which is received a member 136 of tinted glass or the like to facilitate visual inspection of the streams of glass flowing from the orificed tips 48. The glass panel 136 is slidably accommodated in the channel members 135 and supported by abutments or stop members 134 so as to facilitate removal and replacement if necessary.

The feeder construction may be provided with additional means for absorbing and conveying heat away from the glass streams. As particularly shown in FIGURES 2 and 5, L-shaped brackets 140 are secured to the depending portion 38 of the main frame 32 by means of spacer blocks 142 and securing bolts 144. Secured to the horizontal portions of the brackets 140 are members or strips 146 to which are secured blocks 148 provided with openings accommodating a manifold or duct 150 accommodating circulating cooling fluid.

Connected with the pipe 150 is a tubular manifold or member 154 provided with a plurality of forwardly extending fins or vanes 156 which extend between pairs of transverse rows of orificed tips 48 as shown in FIGURE 2. Water or other heat absorbing fluid is circulated through the pipe 150 and the manifold 154 at a substantially constant rate in order to provide for a constant rate of heat absorption from the streams 15 of glass at the cone regions thereof and thus increase the viscosity of the glass of the streams for attenuation into filaments.

It is to be understood that with certain glasses and under certain conditions of operation the cooling unit 90 may be adequate to absorb an amount of heat from the streams to reduce the viscosity of the glass of the streams to attenuation temperatures or condition, and the arrangement of fins 156 may be employed where it is desired to increase the viscosity of the glass streams.

It is apparent that, within the scope of the invention, modifications and different arrangements may be made other than as herein disclosed, and the present disclosure is illustrative merely, the invention comprehending all variations thereof.

I claim:

1. A temperature stabilizing system for a stream feeder arranged to discharge a plurality of streams of molten mineral material including means for supplying electric energy to the feeder for maintaining the material therein in a molten state, a first series of convolutions of tubing arranged beneath and spaced from the feeder in generally horizontal relation and adapted to accommodate circulating heat absorbing fluid, said feeder having a floor provided with a plurality of orifices through which streams of mineral material flow therefrom, and a second series of convolutions of tubing arranged in substantially vertical stacked relation embracing the region of the streams and accommodating circulating heat absorbing fluid, the convolutions of the second series being in vertically spaced relation.

2. A temperature stabilizing system for a stream feeder arranged to discharge a plurality of streams of molten glass including means for supplying electric energy to the feeder for maintaining the glass in a molten state, said feeder having a floor provided with a plurality of orifices through which streams of glass flow therefrom, a first series of convolutions of tubing arranged in substantial parallelism with and spaced from the floor of the feeder and adapted to accommodate circulating heat absorbing fluid, and a second series of convolutions of tubing with the convolutions arranged in vertically stacked spaced relation embracing the region of the streams and accommodating a heat absorbing fluid, a plurality of heat absorbing fins disposed adjacent the streams, and a manifold supporting the fins and accommodating a circulating cooling fluid for conveying away heat absorbed from the streams by the fins.

3. Apparatus of the character disclosed, in combination with a feeder arranged to deliver streams of molten mineral material through orifices in a floor of the feeder, support means for the feeder, a conduit carried by the support means, said conduit being configured with a first series of convolutions, certain of the convolutions of said first series being arranged in a plane substantially parallel with and spaced from the floor of the feeder and the outermost convolutions of said series surrounding the lower portion of the feeder, a second series of convolutions arranged in vertically stacked relation embracing the streams with the convolutions of the second series disposed in spaced relation, said conduit being adapted to receive and convey heat absorbing fluid to stabilize temperatures adjacent the streams and feeder and to impede heat flow downwardly from the feeder.

4. Apparatus of the character disclosed, in combination with a feeder arranged to deliver streams of molten mineral material through orifices in a floor of the feeder, means for attenuating the streams to continuous filaments, a main frame supporting the feeder, a supplemental frame, a conduit supported by the supplemental frame, said conduit being continuous and fashioned with a series of close convolutions in vertically stacked relation embracing filaments formed from the streams and fashioned with a series of close convolutions arranged in a plane substantially parallel with and spaced from the floor of the feeder, said conduit being adapted to accommodate circulating heat absorbing fluid, adjacent the streams and feeder, and means pivotally connecting the supplemental frame with the main frame whereby the supplemental frame and conduit sections may be moved to a position remote from the feeder.

5. Apparatus of the character disclosed, in combination with a feeder arranged to deliver streams of molten mineral material through orifices in a floor of the feeder, means for attenuating the streams to continuous filaments, a main frame supporting the feeder, a supplemental frame, a conduit supported by the supplemental frame, said conduit being continuous and fashioned with a first series of convolutions in vertically stacked relation and a second series of convolutions arranged in a plane substantially parallel with and spaced beneath the floor of the feeder, said conduit being adapted to receive and convey heat absorbing fluid, means pivotally connecting the supplemental frame with the main frame whereby the supplemental frame and conduit may be moved to a position remote from the feeder, latch means for normally retaining said supplemental frame and conduit in a position of use, a pipe supported by the supplemental frame, a nozzle connected with said pipe, the pipe being connected with a supply of water under pressure whereby a spray of water is delivered by the nozzle onto the filaments.

6. Apparatus of the character disclosed, in combination with a feeder arranged to deliver streams of molten mineral material through orifices in a floor of the feeder, means for attenuating the streams to continuous filaments, a main frame supporting the feeder, a supplemental frame connected with the main frame, a conduit supported by the supplemental frame, said conduit being continuous and fashioned with a first series of spirally arranged convolutions in vertically stacked spaced relation and a second series of spirally arranged convolutions in close relation disposed in a plane substantially parallel with and spaced from the floor of the feeder, said conduit being adapted to receive and convey heat absorbing fluid to impede heat flow downwardly from the feeder.

7. Apparatus of the character disclosed, in combination, a walled feeder adapted to contain filament-forming mineral material, a main frame supporting the feeder, said main frame having a depending wall portion and a floor portion, heat resistant refractory disposed between the walls of the feeder and the depending portion of the main frame, said feeder being provided with terminals arranged to be connected with electric current for heating material contained in the feeder, said feeder having a floor provided with a plurality of tips formed with orifices through which flow streams of the material to form filaments, means for attenuating the streams to filaments by winding the filaments on a rotating collector, a continuous conduit fashioned in a plurality of vertically stacked convolutions in close relation and a plurality of convolutions in close relation arranged in parallelism with the floor of the feeder and the floor of the depending portion of the frame, said conduit arranged to contain a circulating heat absorbing fluid, and a supplemental frame pivotally movable relative to the main frame and feeder and supporting said conduit and latch means for retaining said supplemental frame and conduit adjacent the feeder, said latch means being releasable whereby said supplemental frame and conduit may be moved to a position remote from the feeder.

8. Apparatus of the character disclosed, in combination, a walled feeder adapted to contain filament-forming mineral material, a main frame supporting the feeder, said main frame having a depending portion and a floor portion, heat resistant refractory disposed between the walls of the feeder and the depending and wall portions of the main frame, said feeder being provided with terminals arranged to be connected with electric current for heating the feeder and material contained therein, said feeder floor being provided with a plurality of tips formed with orifices through which flow streams of the material to form filaments, means for attenuating the streams to filaments by winding the filaments on a rotating collector, a continuous conduit fashioned in a plurality of vertically stacked convolutions surrounding the filaments and a plurality of convolutions arranged in parallelism with the floor of the feeder, said conduit arranged to contain a circulating heat absorbing fluid, a supplemental frame pivotally movable relative to the main frame and feeder and supporting said conduit and latch means for retaining said supplemental frame and conduit adjacent the feeder, said latch means being releasable whereby said supplemental frame and conduit may be moved to a position remote from the feeder, a pipe supported by the supplemental frame, a nozzle connected with the pipe, the pipe being connected with a supply of water under pressure whereby a spray of water is delivered by the nozzle onto the filaments.

9. Apparatus of the character disclosed, in combination, a walled feeder adapted to contain filament-forming mineral material, a main frame supporting the feeder, said main frame having a depending portion and a floor portion, heat resistant refractory disposed between the walls of the feeder and the depending and wall portions of the main frame, said feeder being provided with terminals arranged to be connected with electric current for heating the feeder and material contained therein, said feeder floor being provided with a plurality of tips formed with orifices through which flow streams of the material to form filaments, means for attenuating the streams to filaments by winding the filaments on a rotating collector, a continuous conduit fashioned in a plurality of vertically stacked convolutions in close relation and a plurality of convolutions in close relation arranged in parallelism with the floor of the feeder, said conduit arranged to contain a circulating heat absorbing fluid, a supplemental frame pivotally movable relative to the main frame and feeder and supporting said conduit and latch means for retaining said supplemental frame and conduit adjacent the feeder, said latch means being releasable whereby said supplemental frame and conduit may be moved to a position remote from the feeder, a plurality of heat absorbing fins disposed adjacent the streams, and a manifold supporting the fins and accommodating a circulating cooling fluid.

(References on following page)

References Cited in the file of this patent

UNITED STATES PATENTS

| | | |
|---|---|---|
| 1,950,219 | Blum | Mar. 6, 1934 |
| 2,287,557 | Modigliani | June 23, 1942 |
| 2,632,287 | Phillips | Mar. 24, 1953 |
| 2,634,553 | Russell | Apr. 14, 1953 |
| 2,846,157 | Stephens et al. | Aug. 5, 1958 |
| 2,908,036 | Russell | Oct. 13, 1959 |

FOREIGN PATENTS

| | | |
|---|---|---|
| 1,050,646 | France | Jan. 8, 1954 |